(No Model.)
2 Sheets—Sheet 1.
S. T. WILLIAMS.
REEL FOR COILING WIRE RODS OR ROPES.
No. 269,905. Patented Jan. 2, 1883.
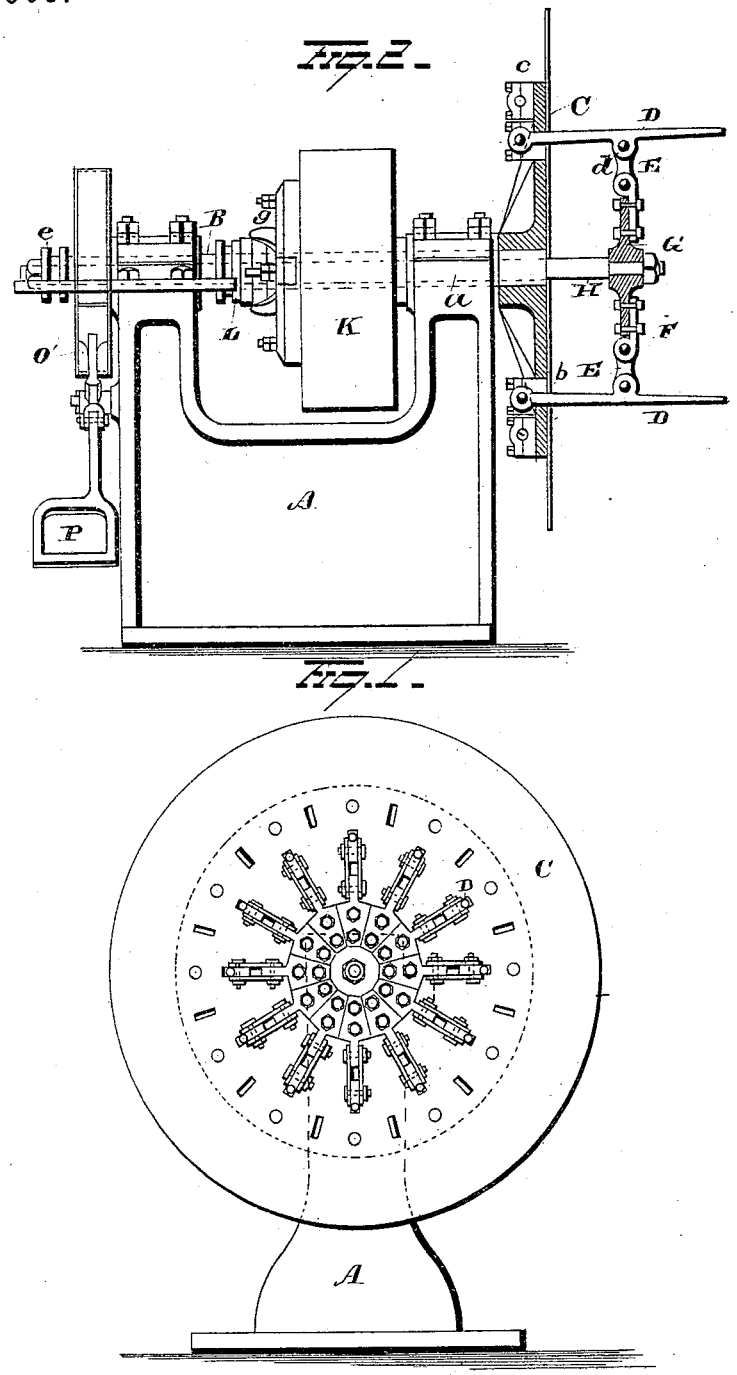
WITNESSES
INVENTOR
Saml. T. Williams
Attorney (No Model.) 2 Sheets—Sheet 2.
S. T. WILLIAMS.
REEL FOR COILING WIRE RODS OR ROPES.
No. 269,905. Patented Jan. 2, 1883.
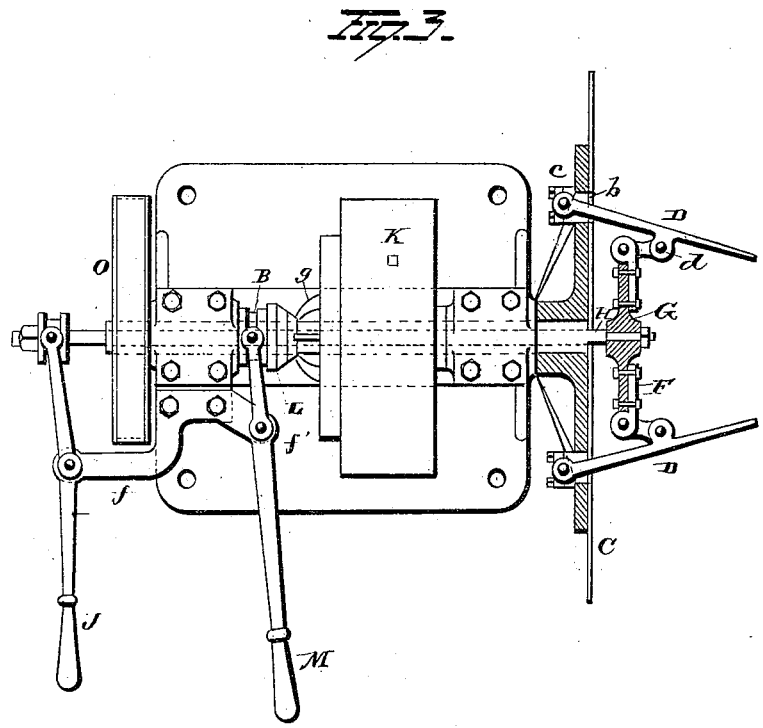
WITNESSES
INVENTOR

UNITED STATES PATENT OFFICE.

SAMUEL T. WILLIAMS, OF TROY, NEW YORK.

REEL FOR COILING WIRE, RODS, OR ROPES.

SPECIFICATION forming part of Letters Patent No. 269,905, dated January 2, 1883.

Application filed July 25, 1882. (No model.)

*To all whom it may concern:*

Be it known that I, SAMUEL T. WILLIAMS, of Troy, in the county of Rensselaer and State of New York, have invented certain new and useful Improvements in Reels for Coiling Wire, Rods, or Rope; and I do hereby declare the following to be a full, clear, and exact description of the invention, such as will enable others skilled in the art to which it pertains to make and use the same.

My invention relates to an improvement in reels for coiling wire, rods, or rope and other similar articles, the object of the same being to provide a reel the arms of which are held in their proper relative positions at right angles to the face-plate while coiling the wire, and are adapted to be inclined, so as to lessen the circumference of the circle formed by the said arms when it is desired to remove the coiled wire from the reel.

With these ends in view my invention consists in the parts and combinations of parts, as will be more fully described, and pointed out in the claims.

In the accompanying drawings, Figure 1 is a front elevation of my improved machine. Fig. 2 is a side view of the same, and Fig. 3 is a plan view.

A represents the frame or base of the machine, provided on its upper surface with the bearings a, in which the hollow shaft B is journaled. This shaft B is provided at its outer end with the face-plate C, rigidly secured thereto, the latter being provided at regular intervals apart with the openings b for the passage of the arms D. These arms D are made of metal of any suitable shape and size, and pass through the said openings b in the face-plate, and are pivotally secured to the brackets c, which latter are rigidly secured to the rear side of the said face-plate. The arms D are arranged in the form of a circle equidistant from the center of the face-plate C, and each arm is provided on its inner face with a rearwardly-projecting knuckle, d, to which one end of each of the links E is pivotally connected, while the opposite or inner ends of the said links are pivotally secured to the arms F, which latter are rigidly secured to the disk G.

Passing longitudinally through the shaft B is the shaft H, which latter is slightly longer than the said shaft B, and projects therefrom at both ends. This shaft H is provided at its inner end with the disk G, to which the arms F are rigidly secured, and at its outer end with the circumferentially-grooved collar e, with which the lever J engages. This lever J is pivotally secured to the projecting arm f, and by simply moving the free end of the lever outward the arms are caused to assume a position at right angles to the face-plate, as shown in Fig. 2, and by reversing the motion of the said lever the disk G is forced inward toward the face plate C, and through the intervention of the links E causes all the arms D to move inward simultaneously until they assume positions similar to those shown in Fig. 3. When the disk G is in the position shown in Fig. 2 the arms of the reel are in proper position for winding, and are so held until the lever J causes them to assume the inclined position.

In a great many reels now in use it is sometimes an extremely difficult matter to disengage the wire therefrom if it should be wound tight thereon; but by my improved method I am enabled without the least trouble or inconvenience to instantaneously decrease the diameter of the circle formed by the arms, which leaves the coiled wire, rod, or rope free to drop off or be removed without any exertion on the part of the operator. By pivoting the arms D to the rear of the face-plate, instead of the front thereof, the circle is also decreased close up to the face-plate, which prevents the coil of wire from sticking thereto when the arms are inclined inward.

K is a combined pulley and friction-clutch, by means of which motion is transmitted to the shaft B. This combined pulley is loosely journaled on the shaft B, and is provided at one side with the spring-actuated arms g, with which the friction-cone L engages. This cone is secured to the shaft B by feather-and-groove connection, and consequently revolves simultaneously with the said shaft, but has free longitudinal movement independent thereof.

M is a lever pivoted to the arm f', and adapted to engage with and control the said friction-cone. By moving the free end of the lever M outward toward the lever J the cone L is forced inward between the arms g, which produces sufficient friction between the parts to cause the shaft B to revolve with the pulley K. By moving the cone away from the pulley K the connection between the parts is broken and the pulley K is free to revolve independent of the shaft B. To prevent the reel from revolving after the cone L has been moved away from the pulley K, I have provided a friction brake-wheel, O, around which the brake-strap O' passes. By pressing down on the brake-lever P the rotary motion of the shaft B can be instantly stopped as soon as the cone is moved away from the pulley.

At the commencement of the coiling operation the parts are in the position shown in Fig. 2, and as soon as sufficient wire, wire rod, or rope has been wound thereon the lever M is first moved so as to disengage the cone L from the arms g, the brake-lever O' applied to stop the revolution of the reel, and the free end of the lever J moved inward, which inclines the arms D and allows the coiled wire, &c., to drop off or be removed without trouble.

My invention is simple in construction, is of few parts, is easy of operation, is durable and effective in use, and can be manufactured at a comparatively small cost.

It is evident that slight changes in the construction and relative arrangement of the different parts might be resorted to without departing from the spirit of my invention; and hence I would have it understood that I do not limit myself to the exact construction shown and described, but consider myself at liberty to make such changes as come within the spirit and scope of my invention.

I am aware that a machine for coiling wire and rods has been patented wherein a face-plate having reel-arms pivoted thereto, which are contracted and expanded by means of a sliding cam-plate, which engages with rearward projections on the reel-arms, and hence I would have it understood that I make no claim to such construction and arrangement of parts.

Having fully described my invention, what I claim as new, and desire to secure by Letters Patent, is—

1. In a machine for coiling wire, rods, &c., the combination, with a face-plate attached to a hollow shaft and reel-arms pivoted to the face-plate, of a longitudinally-adjustable shaft supported within the hollow shaft, and arms or links for connecting the adjustable shaft with the reel-arms at a point on the outer side of the face-plate, substantially as set forth.

2. In a machine for coiling wire, rods, &c., the combination, with a face-plate attached to a hollow shaft and reel-arms pivoted to said face-plate and projecting outwardly therefrom, of a longitudinally-adjustable shaft supported in the hollow shaft, a disk secured to the outer end of the longitudinally-adjustable shaft, and links pivoted to said disk and the inner sides of the reel-arms, substantially as set forth.

3. In a machine for coiling wire, rods, &c., the combination, with a face-plate attached to a hollow shaft, reel-arms pivoted to the face-plate, and a longitudinally-adjustable shaft extending outwardly from the face-plate and connected to the reel-arms by pivoted links, of a loose pulley, clutch, and brake mechanism connected with the hollow shaft, substantially as set forth.

In testimony whereof I have signed this specification in the presence of two subscribing witnesses.

SAMUEL T. WILLIAMS.

Witnesses:
W. H. THOMPSON,
EDMUND O. KNIGHT.